Feb. 6, 1968     B. DE LA CRUZ CARNICERO     3,367,700
SYSTEM FOR CLOSING OF GLASS PANE DOORS
Filed Feb. 21, 1966                                             3 Sheets-Sheet 1
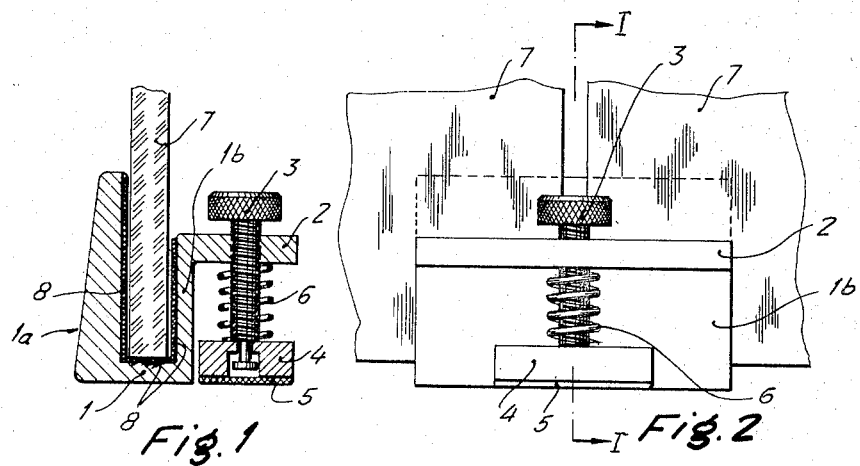
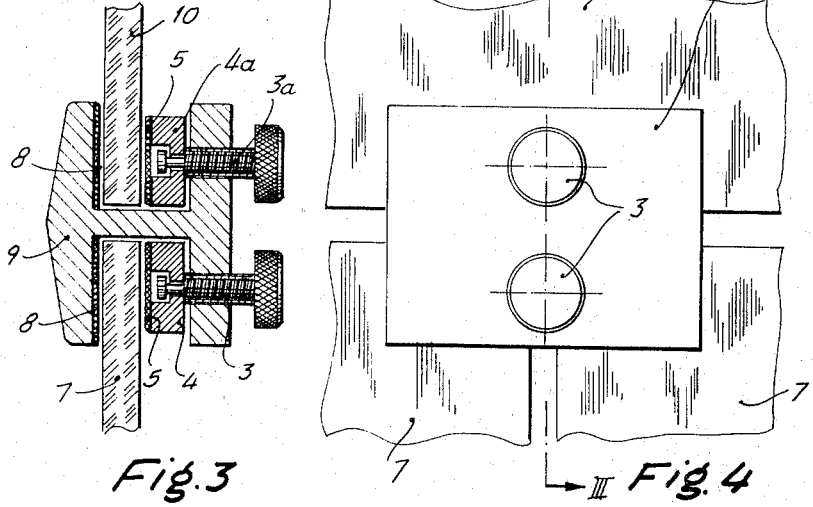
INVENTOR.
Bonifacio de la Cruz
Carnicero
BY
Michael S. Striker Feb. 6, 1968  B. DE LA CRUZ CARNICERO  3,367,700
SYSTEM FOR CLOSING OF GLASS PANE DOORS
Filed Feb. 21, 1966  3 Sheets-Sheet 2

INVENTOR.
Bonifacio de la Cruz
Carnicero
BY
Michael J. Striker
Atty

United States Patent Office 3,367,700
Patented Feb. 6, 1968

3,367,700
SYSTEM FOR CLOSING OF GLASS PANE DOORS
Bonifacio de la Cruz Carnicero, Garcia Morato 43, Madrid, Spain
Filed Feb. 21, 1966, Ser. No. 529,139
18 Claims. (Cl. 292—288)

ABSTRACT OF THE DISCLOSURE

A removable locking arrangement for locking doors, particularly glass doors in closed position, including several different arrangements, whereby none of the arrangements are permanently fixed to either the door or the floor, thereby eliminating an abutment member protruding from the floor or from the door frame, permitting a more simpler locking arrangement, and also preventing the possibility of accidents as often occurs with the present locking arrangements in the prior art.

The present invention relates to a removable locking arrangement for locking doors, especially glass doors in closed position.

Locking arrangements for doors, especially glass doors are known in which an abutment member is fixedly mounted on the floor beneath the door or on the door frame and in which a corresponding member cooperating with the abutment member is fixed to the door, whereby one of the members carries a locking part by means of which the door may be held in the closed position. To permanently affix the abutment member to the floor or to the door frame is inconvenient and may also lead to accidents if the abutment member protrudes beyond the floor or the inner face of the door frame. Likewise to fix the other member to the door is connected with certain difficulties, especially if the door is a glass door.

It is an object of the present invention to overcome these difficulties of locking arrangements according to the prior art for locking doors, especially glass doors in closed position.

It is an additional object of the present invention to provide a removable locking arrangement for locking doors, especially glass doors, in closed position in which none of the components of the locking arrangement has to be permanently fixed to either the door or the floor beneath the door, respectively the door frame.

It is a further object of the present invention to provide for such a removable locking arrangement which is composed of relatively few and simple parts so that the locking arrangement may be manufactured at reasonable cost and will stand up perfectly under extended use.

It is also an object of the present invention to provide for a removable locking arrangement which can either be released only from the inside of the door, or from the inside and the outside thereof.

With these objects in view, the removable locking arrangement according to the present invention for locking doors, especially glass doors, in closed position, mainly comprises engaging means adapted to be slid over an edge portion of the door member when the latter is in an open position, said engaging means having a pair of spaced substantially parallel engaging portions having inner faces facing each other and respectively adapted to engage opposite surface portions of the door member adjacent an edge portion thereof, and connecting means connecting the engaging portions and including a transverse portion extending transverse to said faces of the engaging means and being adapted to extend along the edge portion of the door member between the opposite surface portions thereof, said transverse portion of the connecting means being integral with one end of at least one of the engaging portions and connected to the corresponding end of the other engaging portion. The arrangement includes further adjustable locking means connected to said engaging means for locking said engaging means and the door member engaged thereby in fixed position relative to a second member having a portion adjacent the edge portion of the door member, and the adjustable locking means being movable between an inactive position spaced from the portion of the second member and an active position engaging the portion of the second member.

The locking means may include an abutment member and means carried by the engagement means for holding the abutment member in an active position engaging the portion of the second member.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a transverse cross section taken along the line I—I of FIG. 2 of one embodiment of the locking arrangement according to the present invention;

FIG. 2 is a rear view of the embodiment shown in FIG. 1;

FIG. 3 is a cross section taken along the line III—III of FIG. 4 of another embodiment according to the present invention;

FIG. 4 is a rear view of the embodiment shown in FIG. 3;

Figure 5:
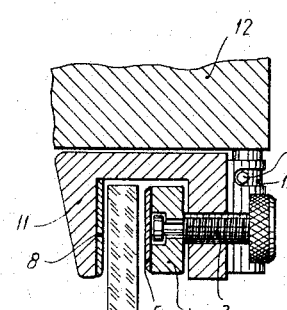
FIG. 5 is a cross section taken along the line V—V of FIG. 6 of a third embodiment according to the present invention.

Referring now to the drawings, and more specifically to FIGS. 1 and 2 of the same, it will be seen that the locking arrangement illustrated in these two figures includes engaging means having a pair of spaced substantially parallel engaging portions 1a and 1b and a transverse portion 1 integrally connecting the engaging portions 1a and 1b at the lower ends thereof. Resilient laminae 8 are provided on the inner surfaces of the engaging portions 1a and 1b and preferably also on the upper surface of the transverse portion 1. The thickness of the engaging portion 1a preferably increases gradually toward the lower end thereof to reinforce this portion. A second transverse portion 2 proects rearwardly from the upper end of the engaging portion 1b integrally connected to the latter.

The arrangement includes further locking means including a plate-shaped abutment member 4 located beneath the second transverse portion 2 and having a bottom face to which a resilient lamina 5 is attached in any convenient manner, for instance by cementing. The abutment member 4 is adapted to engage with the lamina 5 thereof a floor beneath the bottom edge of a door member 7;

the latter may be formed from glass. A screw 3 extending through a threaded bore in the second transverse portion 2 and having at its upper end a preferably knurled head extends with a portion of reduced diameter into a stepped bore through the abutment member 4. The screw is formed at the lower end with a shoulder portion cooperating with the shoulder of the stepped bore through the abutment member 4 so as to connect the screw 3 to the abutment member 4 turnable with respect thereto and movable in axial direction therewith. The screw 3, therefore, forms means for holding the abutment member 4 in an active position engaging the floor. A coil spring 6 is preferably provided about the screw 3 between the bottom face of the second transverse member 2 and the top face of the abutment member 4 and the coil spring 6 is biased so as to tend to keep the abutment member 4 in its active position.

The locking arrangement illustrated in FIGS. 1 and 2 may be used on a door having a single wing 7 or with a door having two wings 7 as shown in FIG. 2. When the locking arrangement is used for holding the two wings 7 as shown in FIG. 2 in closed position, one of the wings 7, for instance the left wing as shown in FIG. 2 is first moved to an open position and then the transverse portion 1 is slipped under the bottom edge of the opened wing so that a bottom portion of the latter becomes located between the engaging portions 1a and 1b. The member formed by the portions 1, 1a, 1b and 2 is then moved on the left wing 7, as viewed in FIG. 2, until the right edge of the member coincides with the right edge of the left wing 7 and then the left wing 7 is aligned with the right wing and the aforementioned member is moved back to the position as shown in FIG. 2. Afterwards, the screw 3 is turned in tightening direction so as to press the lamina 5 on the abutment member 4 tightly against the floor beneath the bottom edges of the two door wings 7. Obviously, the above described arrangement may also be used on a door with a single wing 7 for locking the same securely in a closed position.

FIGS. 3 and 4 show a further embodiment of the removable locking arrangement according to the present invention, which may be used for locking two wings 7 of a door in closed position relative to a lintel or upper part of a door frame 10, whereby the two wings 7 and the lintel may be formed from glass plates. The locking arrangement shown in FIG. 3 and 4 comprises a substantially I-shaped member 9 having a transverse portion which may be slipped over the upper edge portions of the two wings 7 so that one of the downwardly extending leg portions of the I-shaped member 9 which forms one of the engaging portions of the arrangement abuts with a resilient lamina 8 attached to the inner surface thereof against front surface portions of the two wings 7. The other engaging portion of the engaging means is constituted in this embodiment by a plate member 4 located between the inner surface of the other downwardly extending leg portion of the I-shaped member 9 and the rear faces of the two wings 7. A resilient lamina 5 is fixed to the face of the plate-shaped member 4 facing the door wings and the plate member 4 is carried on the end of the screw 3 threadingly engaged in the correspondingly threaded bore through the other downwardly extending leg portion of the member 9. The screw 3 is connected to the plate member 4 in the manner described in connection with FIG. 1 and the screw 3 has on its outer end a knurled head so that by turning the screw in one or the other direction the lamina 5 carried by the plate member 4 may be pressed against rear faces of the two-door wings 7 or be removed therefrom.

The locking means in this arrangement are constituted by a pair of leg portions of the member 9 which project upwardly from the transverse portion thereof and the upwardly projecting left leg portion, as viewed in FIG. 3, engages with a resilient lamina connected to the inner face thereof the front face of the member 10. The locking means includes further an additional plate member 4a located between the other upwardly extending leg portion of the member 9 and the rear face of the member 10 and engaging with a resilient lamina 5 fixed to the inner surface thereof the rear face of the member 10. A screw 3a threadingly engaged in a threaded bore in the other upwardly projecting leg portion of the member 9 carries an additional plate member 4a connected thereto at the inner end thereof in the manner as described before and the screw 3a serves to move the lamina 5 carried by the plate member 4a into tight engagement with the rear face of the member 10.

When the arrangement shown in FIGS. 3 and 4 is to be used for locking two wings 7 of the door in closed position relative to a lintel or frame part 10, one of the door wings 7, for instance the left, as viewed in FIG. 4, is opened, the transverse portion of the member 9 is then placed against the bottom edge face of the member 10 and the member 9 is moved in this position towards the right as viewed in FIG. 4 so that the upper portion of the right wing 7, as viewed in FIG. 4, becomes located between the downwardly extending front leg of the member 9 and the plate member 4 carried by the screw 3. The left wing 7, as viewed in FIG. 4 is then swung to its closed position in which it is aligned with the right wing 7, and subsequently thereto the member 9 is moved towards the left to the position as shown in FIG. 4. Finally the two screws 3 and 3a are tightened to press the plate members 4 and 4a against the rear faces of the door wing 7 and the upper member 10 respectively.

Figure 6:
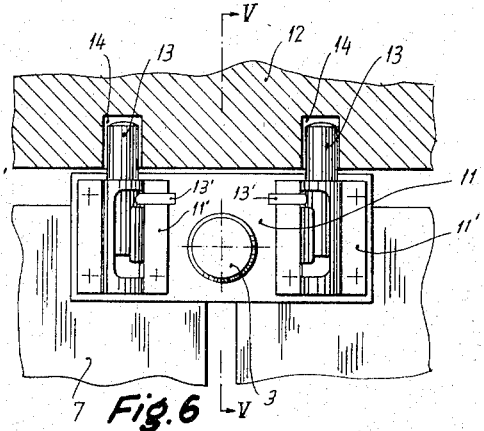
FIG. 6 is a partly sectioned rear view of the embodiment shown in FIG. 5.

The locking arrangement illustrated in FIGS. 5 and 6 serves also to lock two wings 7 of a door in closed position relative to an upper frame member 12 which may for instance be formed from metal. The embodiment illustrated in FIGS. 5 and 6 includes a substantially U-shaped member 11 having a transverse portion extending between the top edge faces of the door wings 7 and the bottom edge face of the member 12, and a pair of downwardly extending leg portions. The left downwardly extending leg portion, as viewed in FIG. 5, engages with a resilient lamina 8 fixed to the inner surface thereof, the front faces of the two door wings 7 and their leg portion forms therefore one of the extending portions of the arrangement. The other engaging portion is constituted in the embodiment shown in FIG. 3 by a plate member 4 having a resilient lamina 5 affixed to its inner surface facing the door wing 7 and is carried by a screw 3 threadingly engaged with the other leg portion of the U-shaped member 11, in the manner as described before in connection with FIGS. 1 and 3.

The locking means of the embodiment illustrated in FIGS. 5 and 6 includes a pair of spaced pins 13 movable in longitudinal direction in a pair of guide sleeves 11' affixed to the rear of the member 11 in any convenient manner. Each of the guide sleeves 11' is formed with a substantially U-shaped slot having an elongated vertical portion and a pair of horizontal portions extending laterally respectively from opposite ends of the vertical portion of the slots. A transverse pin 13' is fixed to each of the pins 13 intermediate the ends of the same and the transverse pins 13' respectively extend through the U-shaped slots in the guide sleeves 11' so that when the transverse pins 13' are located in the upper transverse portions of the U-shaped slot, as shown in FIG. 6, the free upper ends of the pins 13 are respectively located in corresponding bores 14 formed in the member 12.

When the locking arrangement illustrated in FIGS. 5 and 6 is to be used for locking two wings 7 of a door in closed position relative to the transverse portion of a lintel or frame member 12, one of the door wings 7, for instance the left one, as shown in FIG. 6, is moved to an open position and the U-shaped member 11 is then slid onto the upper portion of the open wing 7 with the transverse portion of the U-shaped member engaging the top edge of the open wing. The member 11 is placed on the top portion of the left wing, as viewed in FIG. 6, so that the right edge of the member 11 is aligned with the right edge of the left wing. Then the left wing is moved to its closed position aligned with the right wing and the member 11 is moved to the position as shown in FIG. 6. Of course, the pins 13 are first turned so that the transverse pins 13' thereon are located in the vertical portion of the U-shaped slots or in the lower transverse portion thereof and only after the two wings 7 and the member 11 are brought to the position as shown in FIG. 6 the pins 13 are lifted so that the upper end portions thereof become engaged into the bores 14 and then the pins 13 are turned so that the transverse pins 13' thereon will be respectively located in the upper transverse portion of the slots formed in the sleeve members 11' whereby the pins 13 are held in the upper locking position as shown in FIG. 6. Subsequently thereto the screw 3 is tightened to press the resilient lamina 5 on the plate member 4 tightly against the rear faces of the wings 7. It is obvious that the described arrangement as illustrated in FIGS. 5 and 6 may also be used for locking a single door wing in closed position on a frame member 12 and in this case the member 11 may be shortened and one of the pins 13 may be omitted.

Figure 7:
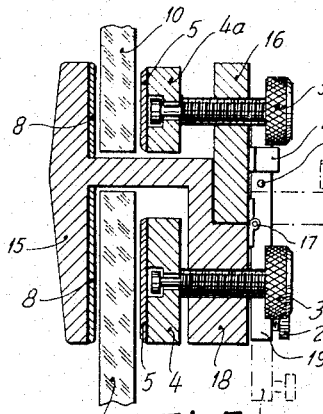
FIG. 7 is a cross section taken along the line VII—VII of FIG. 8 and showing a fourth embodiment of the present invention.
Figure 8:
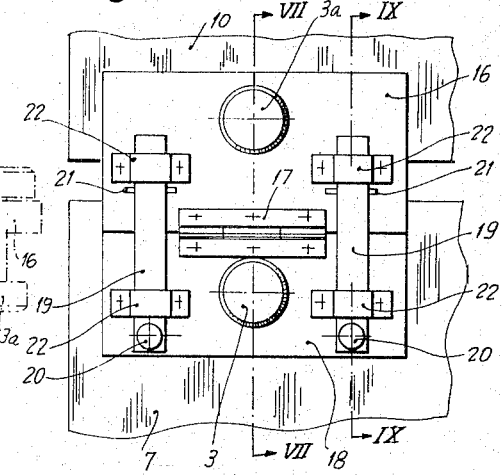
FIG. 8 is a rear view of the embodiment shown in FIG. 7.
Figure 9:
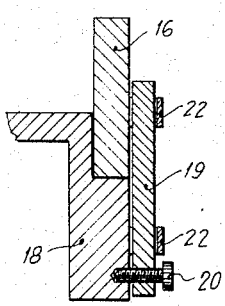
FIG. 9 is a partial cross section taken along the line IX—IX of FIG. 8.

FIGS. 7–9 illustrate a further embodiment of the locking arrangement according to the present invention in which the locking arrangement may be used for locking a single door wing 7 in closed position relative to a lintel or stationary plate member 10 which may, as the door wing 7 be formed from glass. The arrangement illustrated in FIGS. 7–9 is similar to the arrangement illustrated in FIGS. 3 and 4 above described. The arrangement illustrated in FIGS. 7–9 differs from the arrangement illustrated in FIGS. 3 and 4 in that the member 15 which has a transverse portion located between the top edge of the door member 7 and the bottom edge of the lintel or frame member 10 has two downwardly extending leg portions integrally connected thereto, the left of which, as viewed in FIG. 7, forms one of the engaging portions of the engaging means of the arrangement and is provided at its inner face directed towards the door member 7 with a resilient lamina 8 engaging the front face of the door member whereas the other downwardly extending leg portion 18 is spaced from the rear face of the door member 7 and carries by means of the screw 3 a plate member 4, to the inner face of which a resilient lamina 5 is attached, which is adapted to engage the rear face of the door member 7 when the screw 3 is turned in tightening direction. The member 15 has however only one upwardly projecting leg portion integrally connected thereto which is adapted to engage with a resilient lamina 8 fixed to its inner surface the front face of the member 10, whereas another upwardly projecting leg portion 16 is hingedly attached by means of a hinge 17 to the downwardly extending leg portion 18 of the member 15 so that the leg portion 16 may be turned about the axis of the hinge 17 from an active position shown in FIG. 7, in which it extends substantially normal to the transverse portion of the member 15 to an inactive substantially horizontal position. An additional plate member 4a is again located between the rear face of the member 10 and the upwardly projecting leg portion 16 and the plate member 4a is carried on the inner end of a screw 3a threaded through a bore in the member 16 so as to be adapted to engage with a resilient lamina 5 connected to the inner face thereof the rear face of the member 10 when the screw 3a is turned in tightening direction. The locking means of the embodiment illustrated in FIGS. 7–9 include further adjustable means carried by the member 15 and engaging the leg portion 16 hingedly connected thereto for holding the latter in the active position. The adjustable means may include a pair of bars 19 extending spaced from each other in vertical direction and each guided for a movement in vertical direction in a pair of guide brackets 22 respectively fixed to the legs 16 and 18. Transverse pins 21 cooperate with the upper one of the respective guide brackets 22 to limit the upward movement of the bars 19 and these transverse pins 21 cooperate also with the respective lower guide brackets 22 for preventing the bars 19 from slipping out of the lower guide brackets. A screw 20 extends through a threaded bore at the lower end of each bar 19 and the free inner end of each screw may be located in a corresponding depression in the portion 18 of the member 15, as shown in FIG. 9, to hold each of the bars 19 in the upper position as shown in FIG. 8. By loosening the screws 20 the bars 19 may be shifted downwardly so that the upper portions thereof are removed from the upper guide brackets 22, whereby the member 16 may be turned about the axis of the hinge 17 to an inactive position, as shown in dash-dotted lines in FIG. 7, in which the upper face of the lamina 5 attached to the plate member 4a is substantially flush with the upper face of the transverse portion of the member 15.

When the arrangement shown in FIGS. 7–9 is to be used, the bars 19 are lowered so that the upper ends thereof are moved out of the upper brackets 22 fixed to the member 16 and the latter is turned to its inactive position. The transverse portion of the member 15 is then slid over the upper edge face of the door 7 while the latter is in an open position and the member 15 is then fixed to the door 7 by tightening the screw 3. Subsequently thereto the door is moved to a closed position aligned with the member 10 so that the upwardly projecting front leg on the member 15 engages with the resilient lamina 8 the front face of the member 10. The member 16 is then turned about the axis of the pivot means 15 to its active position as shown in FIG. 7 in full lines, the bars 19 are moved to the upper positions as shown in FIG. 8 and are held in the upper positions thereof by tightening the screws 20, and subsequently thereto the screw 3a is tightened to press the resilient lamina 5 on the plate member 4a against the inner face of the member 10.

Figure 10:
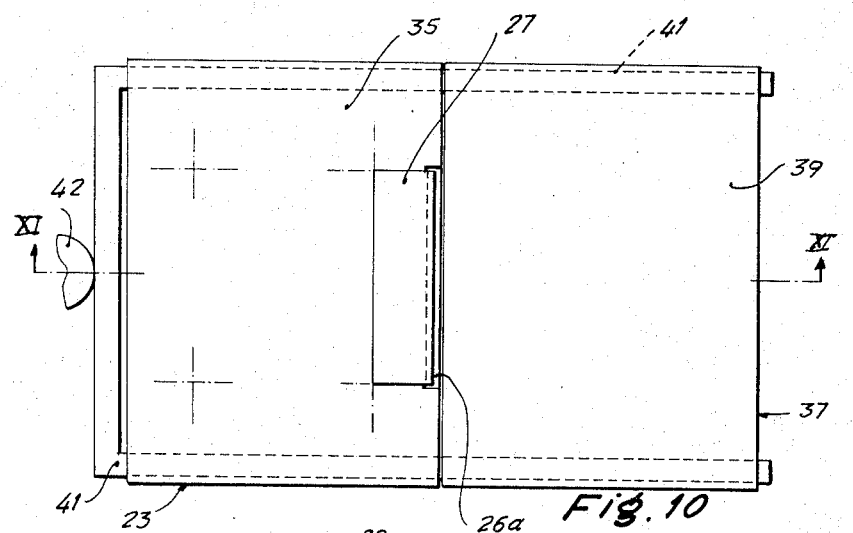
FIG. 10 is a front view of a fifth embodiment according to the present invention.
Figure 11:
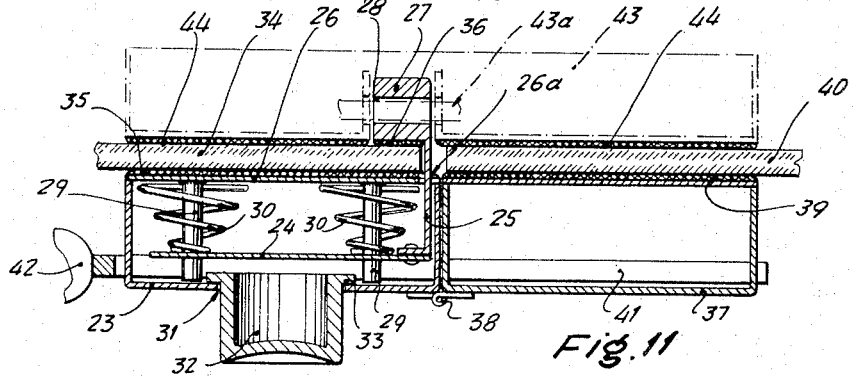
FIG. 11 is a ross section taken along the line XI—XI of FIG. 10.

FIGS. 10 and 11 illustrate a further embodiment of the removable locking arrangement according to the present invention. This arrangement may be used for locking a door member 34 of glass in closed position relative to another member 40 likewise formed from glass and which may either be another door wing or part of a stationary frame member. One of the pair of engaging portions of the engaging means of the arrangement illustrated in FIGS. 10 and 11 is constituted by a short leg portion 27 of a substantially U-shaped member, the other leg portion of which is formed by a plate 24 which is connected to the short leg portion 27 by a transverse connecting portion 25 extending through the gap between facing edge portions of the members 34 and 40. The short leg portion 27 engages with a resilient lamina 36 fixed to its inner face thereof one of the opposite surface portions of the door member 34. The other engaging portion of the engaging means is formed by a wall 26 of a substantially box-shaped member 23, and the lamina 35 fixed to the outer face of the wall 26 engages the opposite surface portion of the door member 34. The transverse portion 25 extends through a slot 26a in the wall 26. The wall 26 carries fixedly connected thereto in any convenient manner a pair of pins 29 which project spaced from each other substantially normally to the wall 26 and through appropriate openings in the plate 24 to guide the latter movable toward and away from the wall 26. A pair of coil compression springs 30 are respectively arranged about the pins 29 between the wall 26 and the plate member 24 to resiliently press the latter away from the wall 26 and to thereby resiliently press the leg 27 into engagement with the door 34. Successive convolutions of each coil spring 30 have preferably increased diameters so that the convolutions may be located one within the other when the coil springs are completely compressed. The box-shaped member 23 has a wall parallel and opposite to the wall 26 and this opposite wall is formed with a central opening 31 therethrough in which a button 32 is slidingly arranged which is adapted, when pressed inwardly, to engage the plate member 24 to move the same against the force of the compression springs 30 towards the wall 26. A rim 33 at the inner end of the button prevents the same from falling out of the opening 31.

The locking means of the arrangement illustrated in FIGS. 10 and 11 comprises a second box-shaped member 37 hinged by hinge means 38 to the box-shaped member 23 in the manner as shown in FIG. 11. In the active position of the box-shaped member 37, shown in FIG. 11, a resilient lamina 39 fixed to a wall portion of the box-shaped member 37 adjacent the member 40 engages one of the opposite surface portions of the latter. To hold the box-shaped member in its active position, as shown in FIG. 11, the side walls of the box-shape are in the active position of the member 37 aligned with each other and the two legs of a fork-shaped member 41 carrying on its transverse portion a handle 42, only partly illustrated in FIGS. 10 and 11, may be extended through the openings in the side walls of the box-shaped members 23 and 37 to hold the latter in the active positions thereof as shown in FIG. 11. The locking means preferably include further a second box-shaped member 43 having a wall facing the opposite portions of the members 34 and 40 and engaging these surface portions with resilient lamina 44 fixed to the aforementioned wall. The box-shaped member 43 is formed with a central opening on opposite sides of which a pair of inwardly extending wings are arranged and the short leg portion 27 extends through this opening between the wings. The aforementioned wings are formed with aligned openings therethrough and the short leg portion 27 is formed with a groove aligned with the aforementioned openings so that a bar member 43a may be extended through the openings in the wings and through the groove in the portion 27 so as to fixedly hold the box-shaped member 43 in the position as shown in FIG. 10.

The removeable locking arrangement shown in FIGS. 10 and 11 may be applied to the members 34 and 40 by first turning the door member 34 to an open position and placing subsequently thereto the transverse portion 25 against the front edge of the door member 34 while pushing the button 32 inwardly so as to compress the coil springs 30. By releasing the button 32 the coil springs 30 will expand so as to press the lamina 30 on the leg portion 27 against one of the opposite surface portions of the door 34 and the lamina 35 on the wall 26 of the box-shaped member 23 against the other of the opposite surface portions. The door member 34 is then turned to its closed position aligned with the member 40, the box member 37 is turned about the axis of the hinge 38 to the active position as shown in FIG. 11 and the fork-shaped member 41 is subsequently thereto placed through the aligned openings in the side walls of the members 23 and 37 to keep the latter in its active position. Subsequently thereto the box-shaped member 43 is placed against the other surfaces of the members 34 and 40 and finally the bar member 43a is extended through the openings of the wings in the box-shaped member 43 and through the slot in the short leg portion 27.

Figure 12:
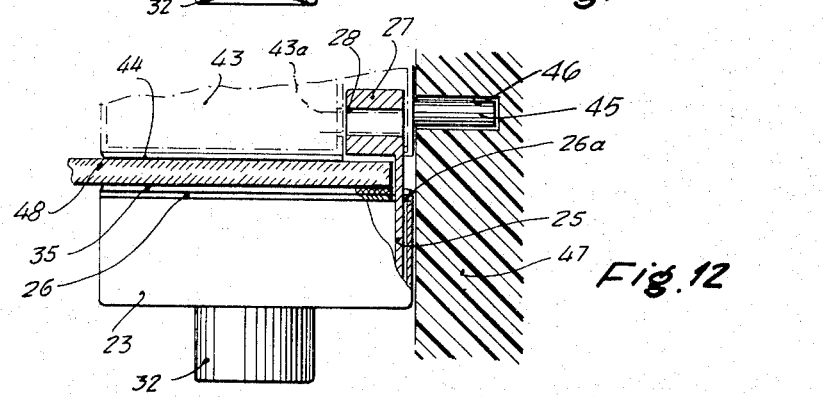
FIG. 12 is a partially cross sectioned top view of a further modification according to the present invention.

The arrangement shown in FIG. 12 is very similar to that illustrated in FIGS. 10 and 11 above described. The arrangement of FIG. 12 serves to lock a door member 40 which may be formed from glass in closed position relative to a frame member 47, which may be formed from metal and which has a surface facing the edge face of the door in closed position of the latter and is formed with a bore 46 extending inwardly in the frame member 47 from the aforementioned surface.

The engaging means of the arrangement shown in FIG. 12 are identical with the engaging means of the above described arrangement as shown in FIGS. 10 and 11. The engaging means include a transverse portion 25, a short leg portion 27 integrally connected to one end of the transverse portion, and a plate member 24, not shown in FIG. 12, connected to the other end of the transverse portion in the manner as shown in FIG. 11. A resilient lamina 35 provided on the wall 26 of the box-shaped member 23 engages one of the opposite surface portions of the door member 48 and a corresponding lamina on the inner face of the leg portion 27 engages an opposite surface portion of the door 48. A button 32 extending through an opening in the wall of the box-shaped member 23 which is opposite the wall 26 thereof serves to engage the plate member 24, not shown in FIG. 12, to displace the latter against compressor springs 30 as described in connection with FIG. 11. The locking means in the arrangement shown in FIG. 12 comprises a box-shaped abutment member 43 having a wall portion facing the other surface portion of the door member 48 to which a resilient lamina 44 is fixed which engages the other surface portion of the door 48. A pin 45 fixed to a side wall of the box-shaped abutment member 43 is located in the bore 46 of the frame member 47. The wall of the box-shaped member 43 through which the lamina 44 is fixed is formed with an opening through which the short leg portion 27 of the engaging means extends and a bar 43a may be pushed through openings in wall portions extending to opposite sides of the aforementioned opening formed in the wall of the member 43 facing the door 48 and through a slot 28 formed in the leg portion 27 so as to hold the box-shaped abutment member 43 in the position as illustrated in FIG. 12.

The aforementioned arrangement may be applied to the door 48 and to the frame member 47 in the following manner. The door is first moved to an open position and the above described engaging means are applied to opposite surface portions of the door 48, while the latter is in the open position, in the manner as described above in connection with FIG. 11. The pin 45 of the box-shaped abutment member 43 is then placed in the opening 46 of the frame member 47, the door is swung to the position as shown in FIG. 12 and finally the bar 43a is placed through the openings in the portions of the box-shaped member 43 and through the slot 28.

It will be understood that each of the elements described above, or two or more together, may also find a useful application in other types of removable locking arrangement for locking doors in closed position, differs from the types described above.

While the invention has been illustrated and described as embodied in a removable locking arrangement for locking a door, especially a glass door in closed position, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A removable locking arrangement for locking doors, especially glass doors in closed position, comprising, in combination, engaging means adapted to be slid over an edge portion of a door member when the latter is in an open position, said engaging means having a pair of spaced substantially parallel engaging portions having inner faces facing each other and being respectively adapted to engage opposite surface portions of the door member adjacent to the edge portion thereof, and connecting means connecting said engaging portions and including a transverse portion extending transverse to the faces of said engaging portions and being adapted to extend along an edge portion of the door member between said opposite surface portions thereof, said transverse portion of said connecting means being fixedly connected to one end of at least one of said engaging portions and connected to the corresponding end of other engaging portions; and adjustable locking means connected to said engaging means for locking said engaging means and the door member engaged thereby in fixed position relative to a second member having a portion adjacent to the edge portion of the door member, said locking means being movable between an inactive position spaced from the portion of the second member and an active position engaging said portion of said second member and said locking means including an abutment member and means carried by said engaging means for holding said abutment member in said active position.

2. An arrangement as set forth in claim 1, wherein said means for holding said abutment member in said active position comprises a screw connected at one end thereof to said abutment member for rotation relative thereto and for movement in axial direction together with said abutment member, said screw being threaded in a threaded bore of said engaging means.

3. An arrangement as set forth in claim 2, wherein said transverse portion of said connecting means is integral with one end of each of said engaging portions.

4. An arrangement as set forth in claim 3, and including a second transverse portion integral with the other end of one of said engaging portions and extending transverse to the latter, said second transverse portion being formed with said threaded bore.

5. A removable locking arrangement for locking doors, especially glass doors, in closed position, comprising, in combination, engaging means adapted to be slid over an edge portion of a door member when the latter is in an open position, said engaging means having a pair of spaced substantially parallel engaging portions having inner faces facing each other and being respectively adapted to engage opposite surface portions of the door member adjacent to the edge portion thereof, and connecting means connecting said engaging portions and including a transverse portio extending transverse to the faces of said engaging portions and being adapted to extend along an edge portion of the door member between said opposite surface portions thereof, said transverse portion of said connecting means being formed by a transverse portion of a U-shaped member having a pair of leg portions integral with the transverse portion and projecting to one side of the latter, one of said leg portions of said U-shaped member forming one of said engaging portions adapted to engage one of the opposite surface portions of the door member, the other engaging portion being formed by a plate member located between the other of the opposite surface portions of the door member and the other leg portion of said U-shaped member, said connecting means including further a screw threaded into a bore through said other leg portion and connected at one end thereof to said plate member turnably with respect thereto and movable in axial direction therewith so that said plate member may be pressed by said screw against the other surface portion of said door; and adjustable locking means connected to said engaging means for locking said engaging means and the door member engaged thereby in fixed position relative to a second member having a portion adjacent to the edge portion of the door member, said locking means being movable between an inactive position spaced from the portion of the second member and an active position engaging said portion of said second member.

6. An arrangement as set forth in claim 5, wherein said second member has a pair of opposite surface portions respectively aligned with the opposite surface portions of the door member, and wherein said locking means comprises a pair of legs projecting to the other side of said transverse portion, at least one of which is integral with the latter and adapted to engage one of said opposite surface portions of the other member, and an additional plate member located between the other leg and the other surface portion of said other member, and an additional screw threadingly engaged with said other leg and connected at one end to said additional plate member for moving the latter in and out of engagement with the other surface portion of the other member.

7. An arrangement as set forth in claim 6, wherein both legs of said locking means are integral with said transverse portion.

8. An arrangement as set forth in claim 6, wherein the other leg of said locking means is hingedly connected to the transverse portion movable between an active position extending substantially normal to said transverse portion and an inactive position, and including adjustable means carried by said U-shaped member and engaging said other leg of said locking means for holding the latter in said active position.

9. An arrangement as set forth in claim 5, wherein the second member has a surface facing said edge portion of the door member and is formed with a bore extending from said surface into said second member, and wherein said locking means comprises a pin carried by said U-shaped member movable in axial direction between a locking position in which an end portion of said pin extends into said bore and a releasing position in which said end portion is withdrawn from said bore.

10. An arrangement as set forth in claim 9 and including guide means carried by said other leg portion of said U-shaped member for guiding said pin movable in axial direction and cooperating means on said guide means and said pin for holding the latter in said locking position.

11. A removable locking arrangement for locking doors, especially glass doors, in closed position, comprising, in combination, engaging means adapted to slide over an edge portion of a door member when the latter is in an open position, said engaging means having a pair of spaced substantially parallel engaging portions having inner faces facing each other and being respectively adapted to engage opposite surface portions of the door member adjacent to the edge portion thereof, and connecting means connecting said engaging portions and including a transverse portion extending transverse to the faces of said engaging portions and being adapted to extend along an edge portion of the door member between said opposite surface portions thereof, said transverse portion of said connecting means being formed by a transverse portion of a U-shaped member having a pair of leg portions integral with the transverse portion and projecting to one side of the latter, one of said leg portions of said U-shaped member forming one of said engaging portions adapted to engage one of the opposite surface portions of the door member, the other engaging portion being formed by a plate member located between the other of the opposite surface portions of the door member and the other leg portion of said U-shaped member, and including resilient means located between said other leg portion and said plate member, said resilient means being biased for moving said other leg portion away from said plate member so as to resiliently press said plate member and said one leg portion respectively against the opposite surface portions of the door member; and adjustable locking means connected to said engaging means for locking said engaging means and the door member engaged thereby in fixed position relative to a second member having a portion adjacent to the edge portion of the door member, said locking means being movable between an inactive position spaced from the portion of the second member and an active position engaging said portion of said second member.

12. An arrangement as set forth in claim 11, wherein said plate member forms one wall of a box-shaped member, said resilient means and said other leg portion being located in said box-shaped member and said transverse portion extends through a slot in said wall.

13. An arrangement as set forth in claim 12, wherein said box-shaped member has a second wall spaced from and substantially parallel to said one wall and formed with an opening therethrough, and including a button slidably guided in said opening and adapted to be pressed inwardly to engage said other leg portion of said U-shaped member to move the latter against the force of said resilient means toward said one wall and therewith said one leg portion out of engagement with said one surface portion of said door member.

14. An arrangement as set forth in claim 13, wherein said resilient means are in the form of a pair of coil compression springs, and including a pair of guide pins fixed to said one wall and projecting toward said other wall of said box-shaped member, said other leg portion being formed with a pair of openings through which said guide pins respectively extend and said coil springs being respectively located about said guide pins.

15. An arrangement as set forth in claim 12, wherein the other member has a pair of opposite surface portions respectively aligned with the surface portions of the door member, and wherein said locking means include a first abutment member having a portion adapted to engage one of the opposite surface portions of the other member, said first abutment member being mounted on said box-shaped member movable between an active position in which said portion of said first abutment member engages the surface portion of said other member aligned with the other surface portion of the door member, and an inactive position, and releasable means cooperating with said box-shaped member and said first abutment member for holding the latter in said active position.

16. An arrangement as set forth in claim 15 wherein said first abutment member is hingedly mounted on said box-shaped member.

17. An arrangement as set forth in claim 15, wherein said locking means includes further a second abutment member having a pair of portions respectively adapted to engage the door member at said one surface portion thereof and the other member at the surface portion thereof aligned with said other surface portion of the door member, and additional releasable means for rigidly connecting said second member to said one leg portion to said U-shaped member.

18. An arrangement as set forth in claim 12, wherein the other member has a surface facing the edge face of the door member and is formed with a bore extending from said surface into the other member and wherein said locking means comprises an abutment member having a wall portion adapted to engage in an active position thereof said one surface portion of the door member and a pin carried by the abutment member and located in said bore, and releasable means cooperating with said portion and said abutment member for holding the latter in said active position fixed to said one leg portion.

References Cited

UNITED STATES PATENTS

| | | | |
|---|---|---|---|
| 1,054,386 | 2/1913 | Barton | 292—288 |
| 1,569,146 | 1/1926 | Simon | 292—58 |
| 2,709,615 | 5/1955 | Barnes | 292—339 |
| 2,739,005 | 3/1956 | Naffziger | 292—339 |
| 3,121,261 | 2/1964 | Ritter | 52—499 |

FOREIGN PATENTS 1,233,113   5/1960   France.

MARVIN A. CHAMPION, *Primary Examiner.*

E. J. McCARTHY, *Assistant Examiner.*